United States Patent [19]

Yasuda

[11] Patent Number: 4,763,123
[45] Date of Patent: Aug. 9, 1988

[54] SIGNAL SELECTING CIRCUIT FOR SIMULTANEOUSLY PERFORMING PLURAL INPUT-OUTPUT OPERATIONS

[75] Inventor: Nobuyuki Yasuda, Chiba, Japan

[73] Assignee: Sony Corporation, Tokyo, Japan

[21] Appl. No.: 833,098

[22] Filed: Feb. 25, 1986

[30] Foreign Application Priority Data

Feb. 28, 1985 [JP] Japan .................................. 60-39490

[51] Int. Cl.⁴ .......................... H04Q 9/00; G11B 7/00
[52] U.S. Cl. .............................. 340/825.650; 369/32; 340/825.030
[58] Field of Search ...................... 340/825.04, 825.65, 340/825.68, 825.03, 825.57, 825.51; 369/32, 43, 44; 328/71, 72, 75; 307/241, 242, 527, 528; 375/119, 120; 371/40, 38, 13

[56] References Cited

U.S. PATENT DOCUMENTS

| | | | |
|---|---|---|---|
| 3,560,939 | 2/1971 | Lukacs | 340/825.04 |
| 3,633,163 | 1/1972 | Birchmeier | 340/825.03 |
| 3,978,285 | 8/1976 | Tan | 375/119 |
| 4,233,592 | 11/1980 | Leichele | 340/347 P |
| 4,275,466 | 6/1981 | Yamamoto | 375/113 |
| 4,364,029 | 12/1982 | Villa | 340/347.5 H |
| 4,415,881 | 11/1983 | Lechner et al. | 340/347 AD |
| 4,583,208 | 4/1986 | Verboom | 369/32 |
| 4,587,643 | 5/1986 | Monen et al. | 369/44 |
| 4,630,231 | 12/1986 | Hirata et al. | 369/32 |
| 4,680,764 | 7/1987 | Suzuki et al. | 371/38 |

FOREIGN PATENT DOCUMENTS 0096885 12/1983 European Pat. Off. .
3438565 5/1985 Fed. Rep. of Germany .

OTHER PUBLICATIONS

GB 2044044A, Oct. 8,1980, R. Wada, et al.

*Primary Examiner*—Donald J. Yusko
*Attorney, Agent, or Firm*—Philip M. Shaw, Jr.

[57] ABSTRACT

A signal selecting circuit comprising a plurality of input terminals supplied with a plurality of signals, respectively, a plurality of gate circuits connected to the plurality of input terminals, respectively, a plurality of output terminals supplied with the plurality of signals through the plurality of gate circuits, respectively, a sequence counter for generating count values in order to designte one of the plurality of gate circuits, a decoding circuit for decoding the count values from the sequence counter so as to produce a plurality of gate signals so as to circulatively open the gate circuits and detecting circuit connected to the plurality of gate circuits and for detecting when at least one of the plurality of signals is obtained through one of the gate circuits which is in open state so as to produce an inhibiting signal being provided to the counter to stop the counting operation thereof and to keep the designation of the counter at the last designated gate circuit so that the plurality of signals can be taken out in an impartial priority order.

4 Claims, 8 Drawing Sheets

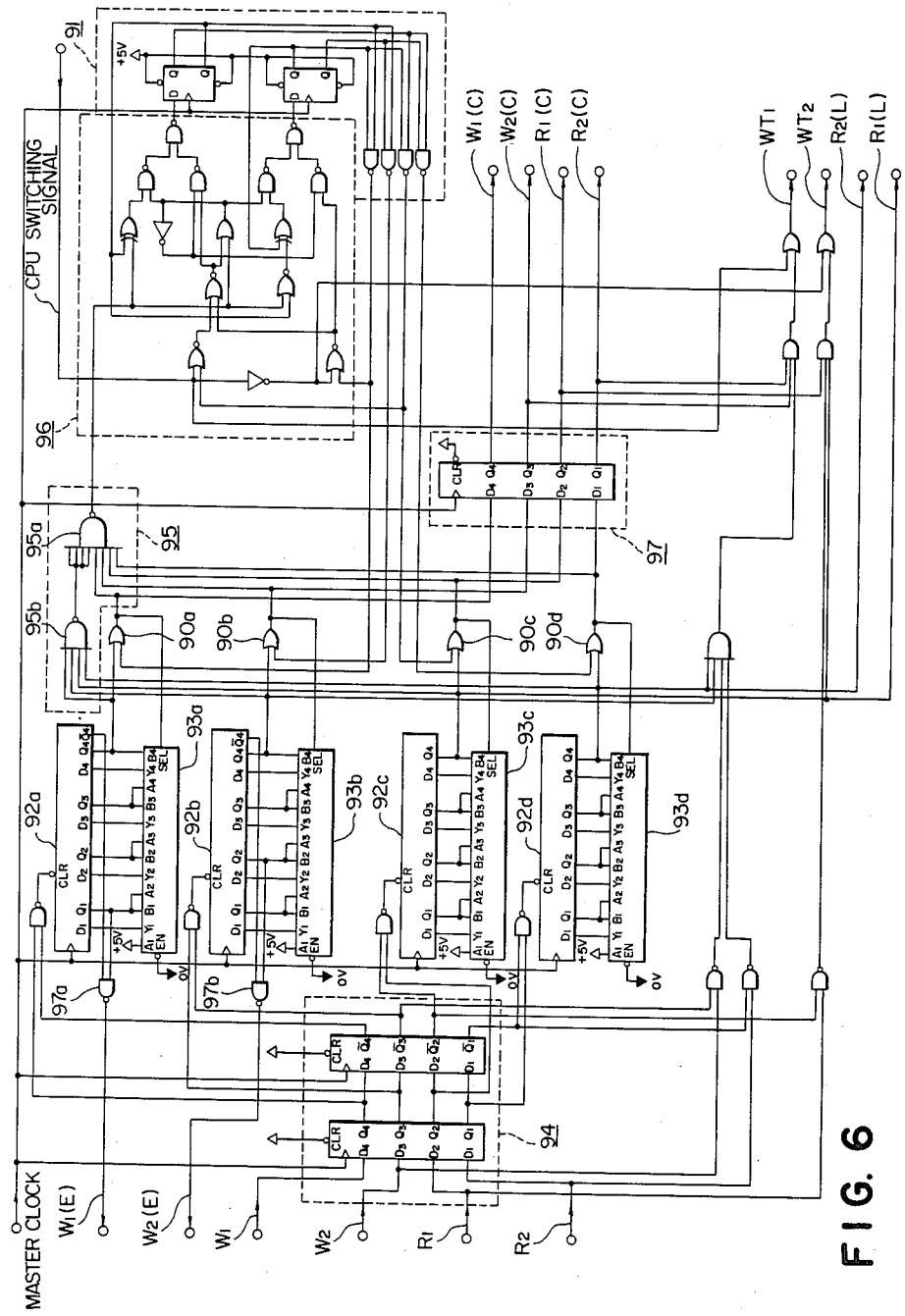
F I G. 6

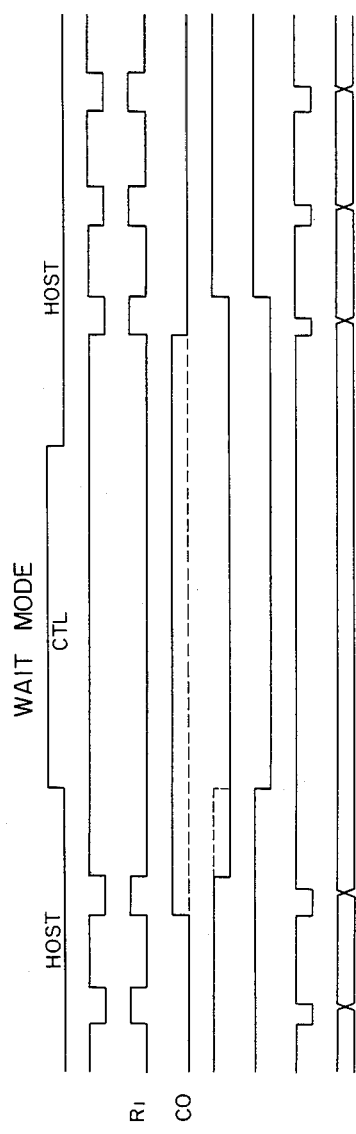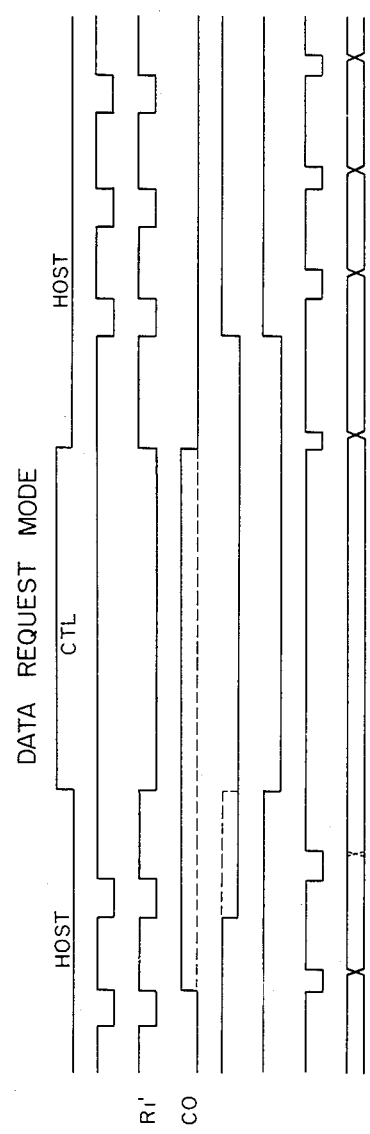

SIGNAL SELECTING CIRCUIT FOR SIMULTANEOUSLY PERFORMING PLURAL INPUT-OUTPUT OPERATIONS

BACKGROUND OF THE INVENTION

1. Field of the Invention

The present invention relates to a signal selecting circuit.

2. Description of the Prior Art

When a plurality of signals are selectively written in a random access memory (hereinafter referred to as RAM) or are read out therefrom in a known circuit where a plurality of input terminals and a plurality of output terminals are connected to the RAM, it is customary that in case the entire input/output systems are synchronized with one another by common clock pulses, input/output buses are switched per required processing time for the RAM so that a plurality of input/output signals can be processed sequentially. However, if the individual input/output systems are in operation nonsynchronously, a longer processing time is required as compared with the synchronous operation. Therefore a block, which corresponds to several-fold writing or reading time, is alloted to each of the input/output systems, and the input/output buses are switched in response to sequential change of the blocks. According to such method, it is impossible to permit simultaneous existence of the input/output signals in the plurality of systems unless a buffer memory is provided for each of the systems.

In the simultaneous operation of merely two systems, the input/output signals can be processed in priority and standby modes without using any buffer memory by processing with priority a first-received command in the two systems. However, in the case of three or more systems, it becomes difficult to achieve satisfactory processing when input/output commands for different systems are received exactly at the same time.

When the nonsynchronized input/output systems are to be processed with a single RAM as mentioned above, it is ordinary in the prior art to solve the problem by using the individual systems in completely different periods of time or by providing a buffer memory of a certain capacity for each of the systems and executing simultaneous input/output operation with respect to the RAM. But the time required for such input/output operation is rendered extremely long, and there arises the problem of requiring separate memories and so forth.

OBJECTS AND SUMMARY OF THE INVENTION

It is an object of the present invention to provide a signal selecting circuit capable of performing a plurality of input/output operations simultaneously without the necessity of any additional memory.

Another object of the invention resides in providing a signal selecting circuit which is formable in smaller dimensions with an advantage of cost reduction.

A further object of the invention is to provide a signal selecting circuit capable of taking out a plurality of signals in an impartial priority order.

And a still further object of the invention resides in providing a signal selecting circuit adapted for application to electronic equipment such as an optical disc playback apparatus.

According to the aspect of the present invention, there is provided a signal selecting circuit comprising a plurality of input terminals supplied with a plurality of signals respectively, a plurality of gate circuits connected to the input terminals respectively, a plurality of output terminals supplied with the plurality of signals through the gate circuits respectively, means for designating one of the gate circuits and producing respective gate signals so as to make the gate circuits circulatively open, and inhibiting means for detecting when at least one of the signals is obtained through one of the gate circuits which is in open state and for keeping the designation of the designating means at the last designated gate circuit.

BRIEF DESCRIPTION OF THE DRAWINGS

FIG. 6 is a circuit diagram showing an embodiment of a signal selecting circuit according to the present invention;

FIGS. 9A to P are timing charts showing signals produced in the signal selecting circuit shown in FIG. 8.

DESCRIPTION OF THE PREFERRED EMBODIMENTS

Hereinafter an optical disc playback apparatus employing the present invention will be described with reference to the accompanying drawings.

If digital data such as character data, display data or computer programs can be reproduced in addition to stereo music by the use of an optical disc system for digital audio, then it becomes possible to realize a playback machine for visual information such as graphic charts or statistics as well as illustrated materials with still pictures, or a video game machine by adding a display unit, hence to achieve expansion of the applicable scope of the digital audio disc system. In comparison with the conventional flexible disc, the presently available compact disc is advantageous since its data storage capacity of about 500 megabytes is considerably greater than that of the former disc.

In the digital audio disc, an error correcting code is processed by the byte through division of 16 bits of 1 sample data into 8 high-order bits and 8 low-order bits. That is, both encoding and decoding interleave, deinterleave and Reed-Solomon codes are executed on a byte-by-byte basis, so that an error correcting code is rendered easily processible in common with respect to digital audio signal and digital data. Since the digital data is not adapted for application to an interpolation process such as mean value interpolation unlike music signal, it is desired that the error rate of the playback data be lower than that of the music signal.

With regard to the signal formats of audio data and other digital data recorded on the compact disc, a detailed description is omitted here since it has already been given in, for example, the U.S. Pat. No. 4,680,764 corresponding to laid open Japanese Patent Publications Nos. 60-201575 and 60-201576, filed by the present applicant.

Figure 1:
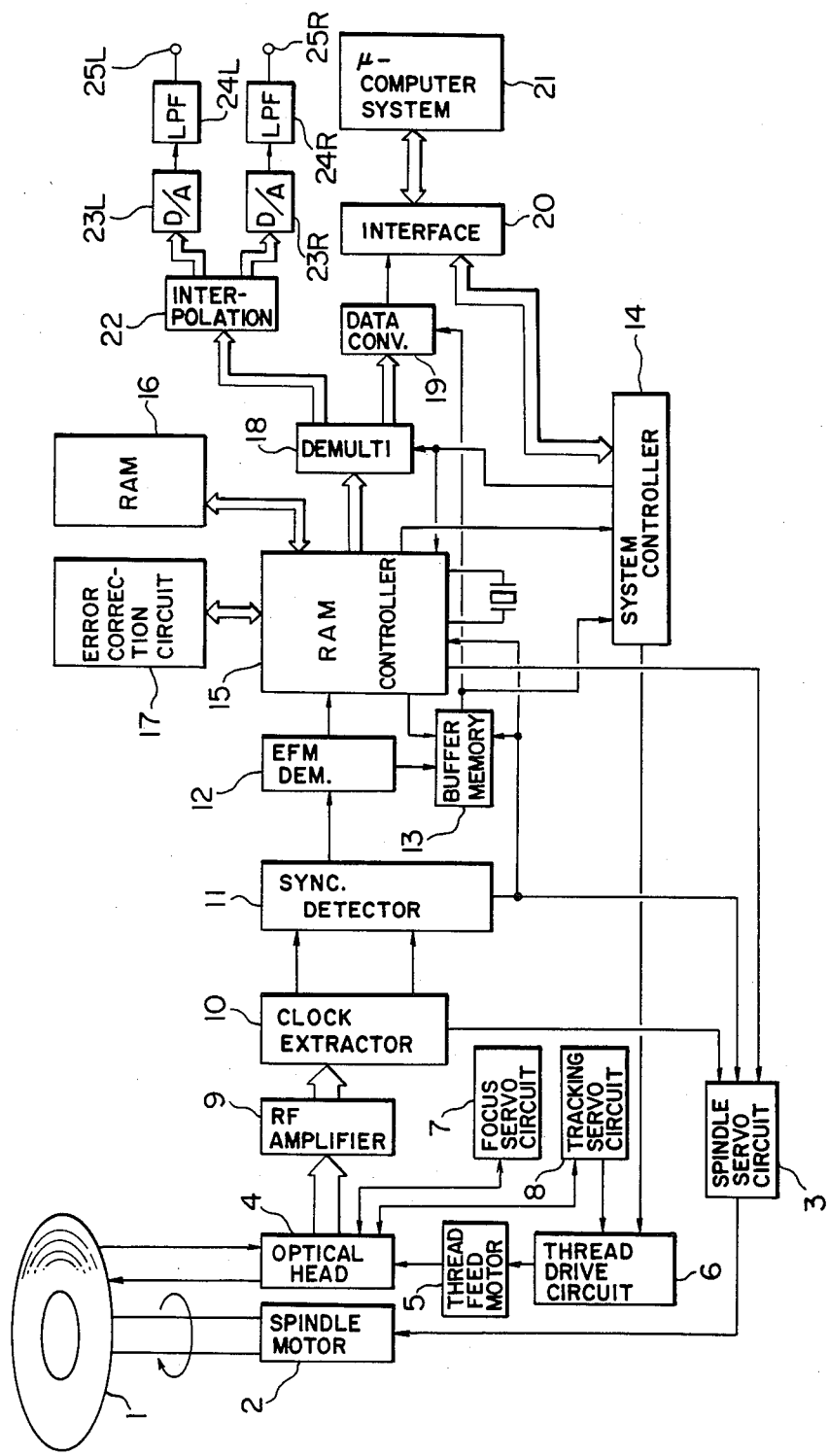
FIG. 1 is a block diagram showing an optical disc playback apparatus applied with a signal selecting circuit according to the present invention.

FIG. 1 shows a block diagram of an optical disc playback apparatus, wherein a digital disc 1 has digital signals recorded thereon spirally in either of the above two formats. The disc 1 is rotated by a spindle motor 2. In this arrangement, the spindle motor 2 is controlled by a spindle servo circuit 3 so as to rotate the disc 1 at a constant linear velocity.

An optical head 4 is equipped with a laser source to generate a reading laser beam, a beam splitter, an optical system including an object lens and so forth, a light sensitive element to receive the laser beam reflected from the disc 1, a focus error sensor consisting of, e.g. a cylindrical lens and a quarter detector combined therewith, and a tracking error sensor using three laser spots. The optical head 4 is so actuated by a thread feed motor 5 as to be movable radially on the disc 1, and the thread feed motor 5 is driven by a thread drive circuit 6. The optical head 4 is displaceable in both a direction perpendicular to the recorded face of the disc 1 and another direction parallel thereto, and is so controlled that proper laser-beam focusing and tracking are retained during a playback operation. For this purpose, there are provided a focus servo circuit 7 and a tracking servo circuit 8.

The playback signal from the optical head 4 is fed to an RF amplifier 9. The output signal of the RF amplifier 9 is fed to a clock extractor 10, whose output signals such as data and clock are then fed to a frame sync detector 11. The digital signal recorded on the disc 1 is in a modulated form processed through eight-fourteen modulation, referred to hereafter as EFM. This modulation is a method of block converting 8-bit data into 14-bit data of a preferred pattern, where the minimum inversion time of the modulated signal becomes long and its lower-frequency component is reduced. A digital demodulator 12 is so formed as to demodulate the EFM signal. The bit clock pulses obtained from the clock extractor 10 and the frame sync signal from the frame sync detector 11 are fed to both the digital demodulator 12 and the spindle servo circuit 3.

The digital demodulator 12 separates the subcoding signal and then feeds it to a system controller 14 via a buffer memory 13. The system controller 14 includes a CPU for controlling the rotation and thread feed of the disc 1 as well as the reading action of the optical head 4. And a control instruction is fed to the system controller 14 via an undermentioned interface 20, so that a required control operation is performed by the controller 14 for reading out a desired digital signal from the disc 1 using the subcoding signal.

The main digital data outputted from the digital demodulator 12 is fed via a RAM controller 15 to both a RAM 16 and an error correction circuit 17. The combination of such RAM controller 15, RAM 16 and error correction circuit 17 eliminates any time axis fluctuation and performs error correction to provide the main digital data. The output of the RAM controller 15 is fed to a demultiplexer 18 which is controlled in accordance with the type of the reproducing disc, such as a stereo music compact disc or a digital data storage disc, and the output path is switched by the system controller 14.

For example, a stereo music compact disc and a digital data storage disc are discriminated from each other by a Q-channel control bit of the subcoding signal recorded in the lead-in track of the disc 1. And simultaneously with switchover of the output path, a control signal representing the result of such discrimination between the two discs is fed to the RAM controller 15, whereby an additional error correcting action is executed for the playback output of the digital data storage disc.

Figure 2:
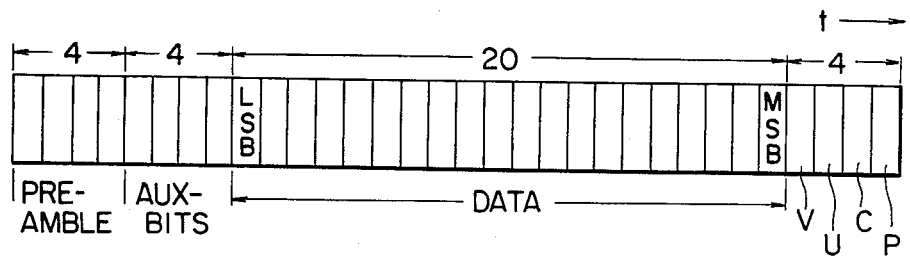
FIG. 2 is a schematic diagram showing a format of digital data.

A data converter 19 is connected to the output path selected in a digital disc playback mode. Both the reproduced digital data and the reproduced subcoding signal are fed from the buffer memory 13 to the data converter 19, where the reproduced data is converted into serial signal. FIG. 2 shows an exemplary word format of serial signal outputted from the data converter 19. In the serial signal, each word is composed of 32 bits, of which the leading four bits correspond to a preamble; the next four bits are auxiliary ones for the data; and the following twenty bits correspond to the data. In the digital data where each word is composed of sixteen bits, such bits are inserted from the least significant bit (LSB). And four bits are added posterior to the digital data. Out of such four bits: V represents a flag to indicate whether the word is valid or invalid; U corresponds to one bit of the subcoding signal; C serves to discriminate between the channels; and P is a parity bit. The bits U of the subcoding signal are inserted one by one in the word format individually and are transferred sequentially.

The above-mentioned word format contrived in view of audio data is fed to the next-stage interface 20 and then is converted into a standard computer data format. Meanwhile the data for the system controller 14 is fed from a micro-computer system as a host computer 21 via the interface 20. The micro-computer system 21 designates addresses to be read out and feeds drive control signals such as a start signal and so forth besides the addressing signals to both the interface 20 and the system controller 14.

An interpolation circuit 22 is connected to the output path of the multiplexer 18 selected when the reproducing disc is of stereo music type, and compensates error data which could not be corrected. The data is divided into left and right channels by the interpolation circuit 22, and the respective data of the two channels are converted into analog signals by D/A converters 23L, 23R and then are obtained from output terminals 25L, 25R via low-pass filters 24L, 24R respectively.

In this example, any time axis fluctuation of the subcoding signal is eliminated by the buffer memory 13. Such correction of the time axis is the same as that executed with respect to the main-channel digital signal by the RAM controller 15 and the RAM 16. The RAM controller 15 produces write clock pulses from the detected frame sync signal synchronously with the playback signal, then writes the digital signal in the RAM 16 by the write clock pulses and, when reading out the digital signal from the RAM 16, uses read clock pulses produced from the output of a crystal oscillator. Such write and read clock pulses are used also for writing the subcoding signal in and reading out the same from the buffer memory 13. Accordingly the subcoding signal read out from the buffer memory 13 includes none of the time axis fluctuation so as to prevent occurrence of any change that may otherwise be induced by such time axis fluctuation in the timing relation between the subcoding signal and the main-channel digital signal.

In the operation of playing back a digital data storage disc, first a read instruction for a predetermined address is executed in the micro-computer system 21. This address corresponds to the absolute time display code itself in the Q-channel and is fed to the system controller 14 via the interface 20. The system controller 14 then controls the thread drive circuit 6 and thereby moves the optical head 4 to the vicinity of the desired read position in accordance with the subcoding signal reproduced by the optical head 4. In this example, playback is started at the position spaced apart by several blocks from the desired read position so as to prevent such malfunction that proper reproduction of the set subcoding signal fails to be performed to consequently bring about non-termination of the access due to some error included in the reproduced subcoding signal. And the desired block is caught by detecting coincidence of the reproduced subcoding signal with the designated address or by counting the frame sync signals after starting the playback at the proper subcoding signal position in the vicinity.

Figure 3:
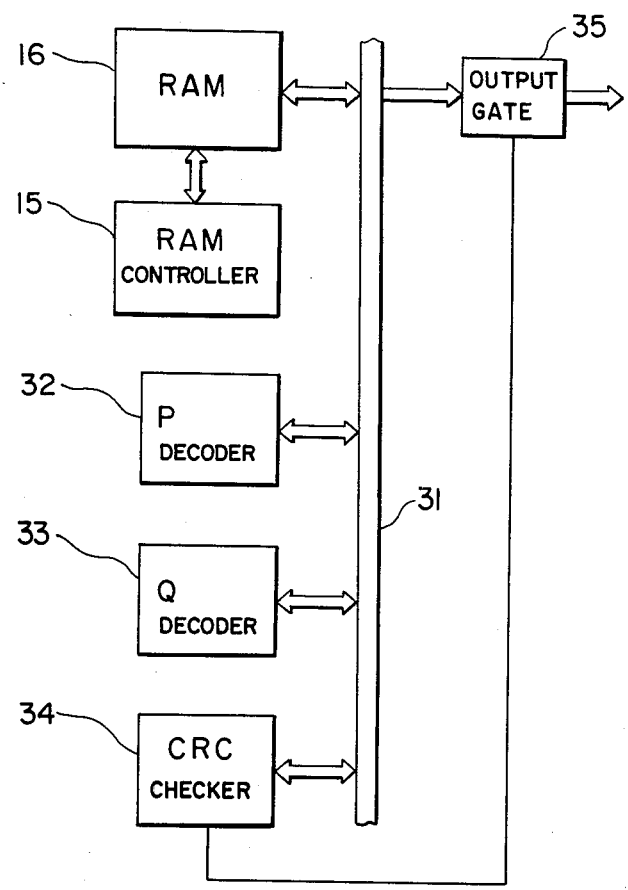
FIG. 3 is a block diagram showing an error correction decoder employed in the apparatus shown in FIG. 1.

FIG. 3 shows an exemplary error correction circuit in a decoder for playback of a digital data storage disc. For simplifying the configuration, the circuit is used for both an audio signal disc and a digital data storage disc. And a CIRC decoder is omitted here. That is, the reproduced data except the block sync signal of each block stored in the RAM 16 has been processed by decoding the CIRC code already and an error flag representing the presence or absence of an error is added to each symbol.

The symbols are read out from the RAM 16 together with error flags and then are fed via a data bus 31 to a P decoder 32 per P sequence of 26 symbols. The P decoder 32 decodes the (26, 24) Reed-Solomon code for correction of any 2-symbol error in one P sequence through the use of the error flag obtained by decoding the CIRC code, and the decoded symbols are written in the RAM 16. In this stage, if any error has been corrected by the P decoder 32, the error flag relative to that symbol is cleared. Upon termination of the P decoding with regard to one block, the data read out from the RAM 16 is fed via the data bus 31 to the Q decoder 33.

Deinterleaving is executed by controlling the addresses in the RAM 16, and the (45, 43) Reed-Solomon code for correcting any 2-symbol error in a single Q sequence is decoded by the Q decoder 33 per Q sequence of one block. In the block where the error has been corrected by such decoding, the error flag relative to that symbol is cleared. Subsequently P decoding is executed again, which is followed by Q decoding. In this manner, each of P decoding and Q decoding is executed twice alternately. After such repeated decoding, the error-corrected playback digital data obtained from the RAM 16 is fed to a CRC checker 34 where error detection is carried out. And the result of such error detection is fed to an output gate 35, which then sets an error flag relative to the data so judged that some error is existent therein.

The error detection result obtained from the CRC checker 34 is usable also for error correction in the P decoder 32 and the Q decoder 33, each of which uses an error flag generated at the time of decoding the CIRC code in the error correction step. Therefore it is rendered possible, by referring to the error detection result of the CRC checker 34 in both P decoding and Q decoding, to prevent improper correction when the error flag in the CIRC code is incorrect.

Figure 4:
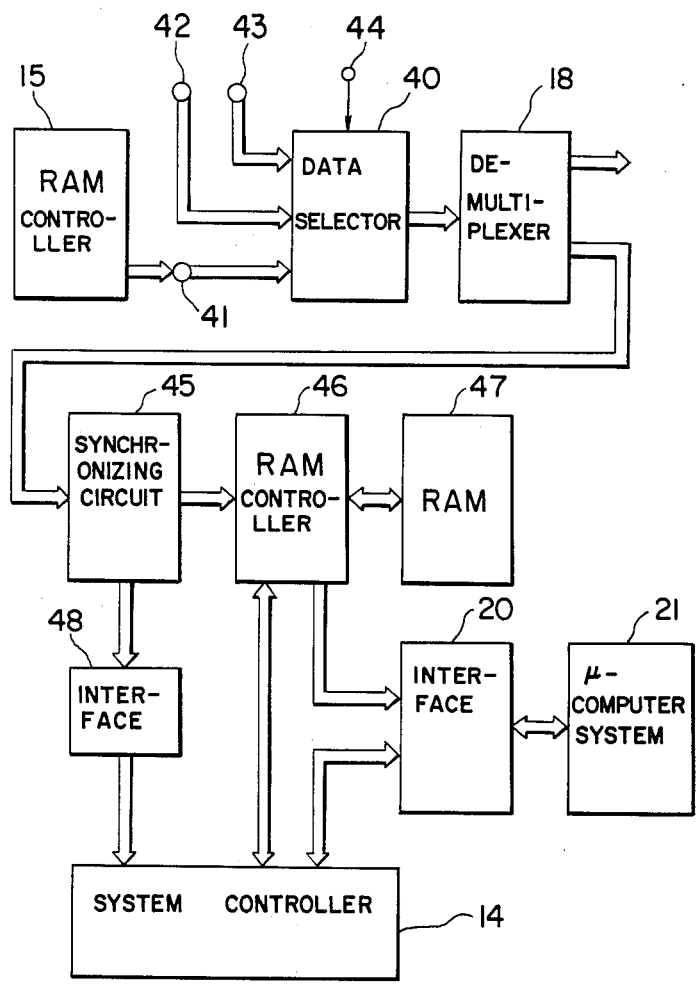
FIGS. 4 and 5 are block diagrams showing peripheral circuits of the apparatus shown in FIG. 1.

Hereinafter a description will be given with reference to FIG. 4 on the circuits located in the stages from the RAM controller 15 to the interface 20 in FIG. 1. A data selector 40 serves to select from among a first digital signal fed from the RAM controller 15 to an input terminal 41 and various accompanying signals thereof, a second digital signal fed to an input terminal 42 and various accompanying signals thereof, and a third digital signal fed to an input terminal 43 and various accompanying signals thereof. The signal thus selected is fed to a synchronizing circuit 45 via a demultiplexer 18. In the first through third digital signals, one word is composed of three bytes, four bytes and two bytes, respectively. The content of the first digital signal is described in the above-mentioned co-pending application; the second digital signal is obtained by transmitting the first digital signal in a serial form and receiving the same; and the third digital signal is an ordinary one used in general.

In the synchronizing circuit 45, which is composed of a one-chip IC, the signals are processed as follows. Output bit clock pulses equal in number to the bit block pulses within the period of one word are obtained from the input bit clock pulses accompanying the selected first, second or third digital signal and common word clock pulses, and common output byte clock pulses are obtained from such output bit clock pulses and common word clock pulses.

An internal block sync signal is produced synchronously with an external block sync signal detected from the digital signal.

The bit order in each word of the first through third digital signals in a serial form is unified with regard to whether the leading bit in each word is LSB or MSB.

Then the digital signals are descrambled. And subsequently, error detection and error status discrimination are executed with respect to the digital signals.

A buffer RAM 47 stores the digital data and error flags per byte therein and corrects any error of the digital data.

A RAM controller 46 provided for controlling the buffer RAM 47 receives from the synchronizing circuit 45 the descrambled output data, error flags per byte, output bit clock pulses, output byte clock pulses, internal block sync signal and so forth. Under control of the CPU incorporated in the system controller 14, the RAM controller 46 performs error correction with respect to the data stored in the RAM and feeds the readout data from the RAM 47 to the micro-computer system as the host computer 21 via the interface 20.

The discriminating signal outputted from the synchronizing circuit 45 and representing the error status such as relative to the presence or absence of any data error and error over is fed to the system controller 14 via an interface 48.

The RAM controller 46 of FIG. 4 will now be described in detail below with reference to FIG. 5, wherein there are shown a write/read control circuit 80 and an address/data switching circuit 81. The serial data obtained from the descrambler of the synchronizing circuit 45 in FIG. 4 is fed to a serial/parallel converter 84 and is thereby converted into parallel data, which is then fed through the switching circuit 81 to, and written in data RAM sections 47a, for example, three sections each having a capacity of $2048 \times 8$ bits, of the buffer RAM 47. Furthermore, error flags for individual bytes of the data obtained from the synchronizing circuit 45 of FIG. 4 are fed via the switching circuit 81 to, and written in an error flag RAM section 47b having a capacity of 8192×1 bits of the buffer RAM 47.

Address signals from a data writing address generator 82 and a data reading address generator 83 respectively are fed via the switching circuit 81 to the buffer RAM 47.

The aforesaid write/read control circuit 80 produces an output control signal in response to the input control signal received from the system controller 14 and thereby controls the write/read action of the buffer RAM 47 and the changeover of the switching circuit 81.

A CPU 88 of the system controller 14, a P/Q parity address conversion ROM 85, an error correction RAM 86 and a system ROM 87 are connected to one another via a bus. Meanwhile, the ROM 85 and the RAM 86 are connected to the switching circuit 81.

When there exists any error in the data written in the RAM 47a while the error flag of each byte is written in the RAM 47b, the data having such error is read out from the RAM 47a and then is written in the error correction RAM 86 so that the error is corrected therein, and the correct data is written in the RAM 47a again. Subsequently the data stored in the RAM 47a is read out therefrom and is fed via the switching circuit 81 and the interface 20 to the micro-computer system as the host computer 21, where the data is loaded.

Figure 7:
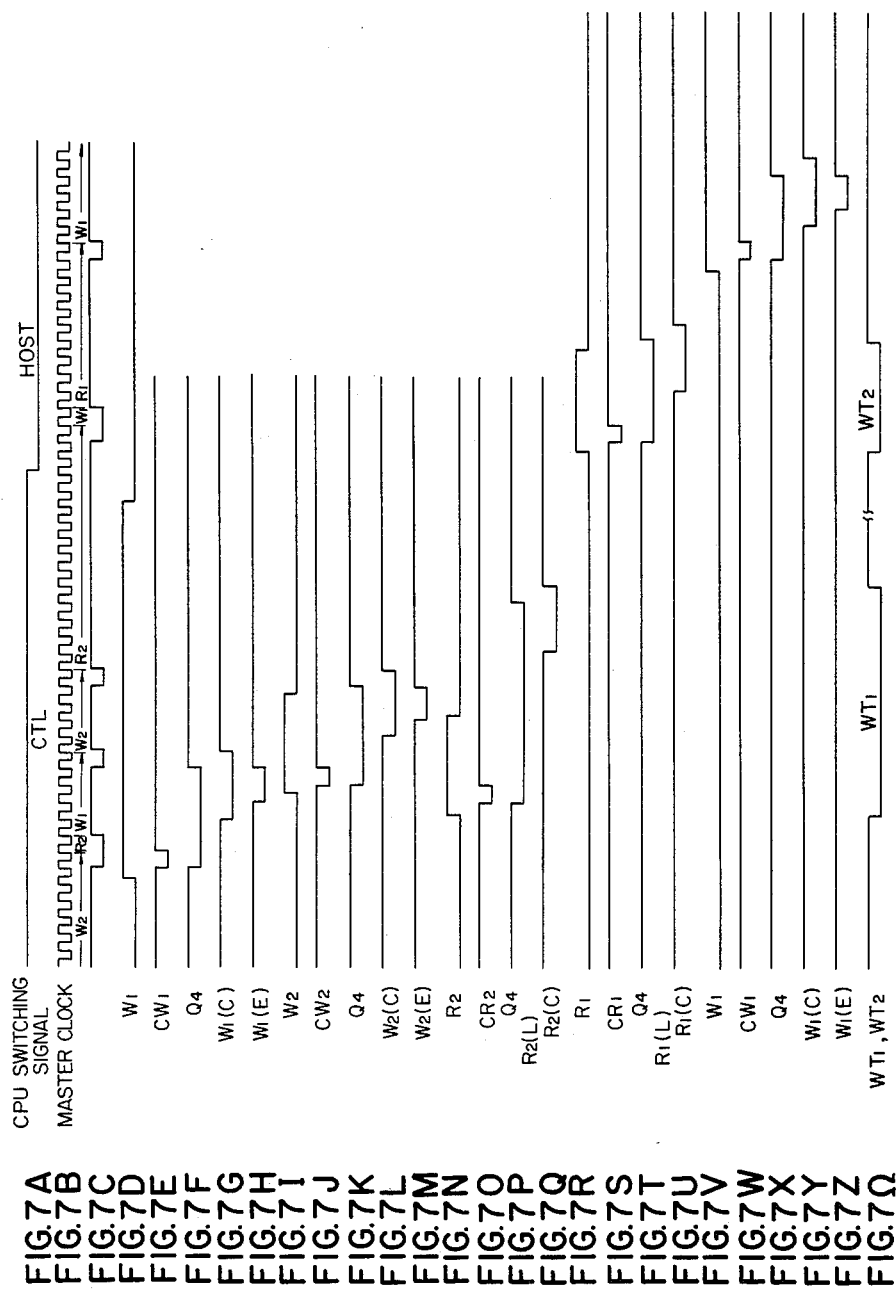
FIGS. 7A to Z and $\Omega$ are timing charts showing signals produced in the signal selecting circuit shown in FIG. 6.

The signal selector circuit incorporated in the write/read control circuit 80 of FIG. 5 will now be described in detail below with reference to FIG. 6. FIG. 7 shows waveforms of signals produced in the individual stages of the signal selecting circuit of FIG. 6.

On the basis of a data loading request from the microcomputer system 21, data write and read modes are prescribed as follows with regard to the buffer RAM 47 in FIGS. 4 and 5.

A mode of writing the output data of the synchronizing circuit 45 in the buffer RAM 47 via the RAM controller 46 is termed here a first write mode, and the signal related thereto is expressed by W1 at least partially.

A mode of writing the data read out from the error correction RAM 86 is termed a second write mode, and the signal related thereto is expressed by W2 at least partially.

A mode of reading out the data from the RAM 47 and feeding it to the micro-computer system 21 via the RAM controller 46 and the interface 20 is termed a first read mode, and the signal related thereto is expressed by R1 at least partially.

And a mode of reading out the data from the RAM 47 and writing it in the error correction RAM 86 is termed a second read mode, and the signal related thereto is expressed by R2 at least partially.

When the buffer RAM 47 is accessed by the CPU 88 of the system controller 14 in the CTL mode of a CPU switching signal of FIG. 7A for error correction of the data, a cycle of the successive first write mode, second read mode and second write mode is repeated to alternately perform writing the data in the RAM 47a and correcting the error of such written data by the RAM 86.

When the buffer RAM 47 is accessed by the microcomputer system 21 in the HOST mode of a CPU switching signal of FIG. 7A, a cycle of the successive first write mode and first read mode is repeated to alternately perform writing the data in the RAM 47a and loading the data, which is stored in the RAM 47a, by the micro-computer 21.

In FIG. 6, the pulse forming circuit 94 is supplied from the system controller 14 with first and second write control input signals W1 and W2 (refer to FIGS. 7D, V and I) and also first and second read control input signals R1 and R2 (refer to FIGS. 7R and N) which are not synchronized with each other so that clear pulses CW1, CW2 and CR1, CR2 (refer to FIGS. 7E, W, J, R and O) obtained in response to the input signals respectively are fed to clear terminals of the shift registers 92a to 92d.

The outputs Q4 of the registers 92a to 92d (refer to FIGS. 7F, X, K, T and P) are fed respectively to OR gate circuits 90a to 90d.

A binary controlling sequence counter 91 is driven by master clock pulses (refer to FIG. 4B) so as to produce gate pulses, which are fed circulatively to the all or some of the gate circuits 90a to 90d.

When the CPU switching signal (refer to FIG. 7A) from the system controller 14 indicates the CTL mode, the counter 91 is controlled by the synchronizing circuit 96 to function as a ternary counter and produces negative pulses (refer to FIG. 7C), which are fed circulatively to the gate circuits 90a, 90b and 90d to open them.

When the CPU switching signal indicates the HOST mode, the counter 91 is controlled by the synchronizing circuit 96 to function as a binary counter and produces negative pulses (refer to FIG. 7C), which are fed to the gate circuits 90a and 90c alternately to open them.

The respective outputs of the gate circuits 90a to 90d are fed to a NAND circuit 95a of a logic circuit 95. Meanwhile the respective outputs Q4 of the registers 92a to 92d are fed to a NAND circuit 95b of the logic circuit 95, and the output thereof is fed to the NAND circuit 95a. The output of the NAND circuit 95a is then fed to the synchronizing circuit 96 for controlling the counter 91 in such a manner as to interrupt the counting operation when a low-level output is obtained from any of the gate circuits 90a to 90d or no output is obtained from any of them. In such a case, the output of each NAND circuit of the counter 91 is turned to a high level as shown in FIG. 7C.

Figure 5:
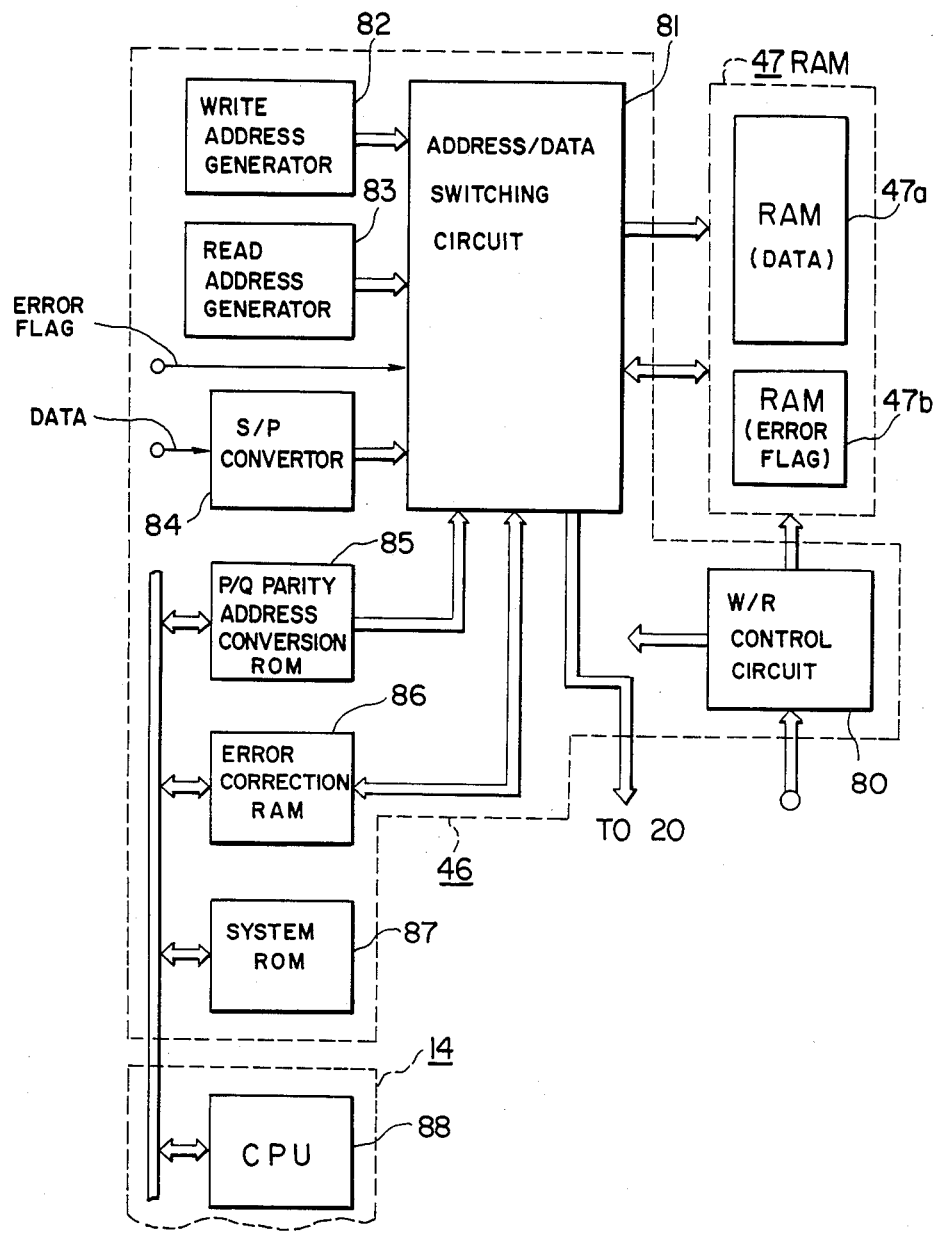

The outputs of the gate circuits 90a to 90d are fed to a latch circuit 97, whose latch outputs are fed respectively to the switching circuits 82 and 83 of FIG. 5 as first and second write control output signals W1 (C), W2 (C) and first and second read control output signals R1 (C), R2 (C) (refer to FIGS. G, Y, L, U and Q), to control switchover of the address signals fed to the buffer RAM 47.

The outputs Q1 and $\overline{Q4}$ of the register 92a are fed to the buffer RAM 47 as a write enable signal W1 (E) (refer to FIGS. H and Z) through a NAND circuit 97a. Meanwhile the outputs Q2 and $\overline{Q4}$ of the register 92b are fed to the buffer RAM 47 as a write enable signal W2 (E) (refer to FIG. 7M) through a NAND circuit 97b.

The outputs Q4 of the registers 92c and 92d respectively serve also as first and second read latch signals R1 (L) and R2 (L) which are fed to latch circuits incorporated in the switching circuit 81 of FIG. 5, thereby latching the data read out from the buffer RAM 47.

First and second wait signals WT1 and WT2 of low level (refer to FIG. 7 Ω) relate, respectively, to the CTL mode and the HOST mode.

The master clock pulses are fed also to the registers 92a to 92d, pulse forming circuit 94 and latch circuit 97 as well as to the counter 91.

Since the relations and operations of the registers 92a to 92d, data selectors 93a to 93d and gate circuits 90a to 90d are similar to one another, they will be described below with reference to the register 92a, data selector 93a and gate circuit 90a as individual examples. When the output Q4 of the register 92a has a high level as shown in FIGS. 7F, X, the counter level of the gate circuit 90a becomes low or high depending on whether the output (refer to FIG. 7C) of the counter 91 is at a high level or a low level. The output of the gate circuit 90a is fed to a select terminal SEL of the data selector 93a. In the case of a high level, inputs B1 to B4 of the data selector 93a are turned into outputs Y1 to Y4 thereof which are fed to inputs D1 to D4 of the shift register 92a; and in the case of a low level, inputs A1 to A4 of the data selector 93a are turned into outputs Y1 to Y4 thereof which are fed to the inputs D1 to D4 of the shift register 92a. The output Q1 of the shift register 92a is turned into the inputs B1 and A2 of the data selector 93a. Similarly the output Q2 is turned into the inputs B2 and A3, the output Q3 into the inputs B3 and A4, and the output Q4 into the input B4, respectively. The input A1 is always kept at a high level.

When the output Q4 of the register 92a has a high level, each of the outputs Q1–Q3 is also at a high level, so that the outputs Q1–Q4 of the register 92a are retained at a high level regardless of whether the output level of the gate circuit 90a changes to be high or low.

However, when a low-level clear pulse CW1 (refer to FIGS. 7E and W) is fed from the pulse forming circuit 94 to the register 92a in response to the low-level input signal W1 (refer to FIGS. 7D and V) then each of the outputs Q1 to Q4 is turned to a low level. If the output (refer to FIG. 7C) of the counter 91 has a high level in the state where the output Q4 of the register 92a is at a low level as shown in FIG. 7F (X), the output of the gate circuit 90a is turned to a high level, so that the outputs Q1–Q4 of the register 92a are each retained at a low level.

When the output of the counter 91 is turned to a low level in the state where the output Q4 of the register 92a is at a low level, then the output Y1 of the data selector 93a first becomes a high-level signal of the input A1 to be fed to the input D1 of the register 92a, so that the outputs Q1 to Q4 of the register 92a are turned sequentially to a high level by master clock pulses.

Figure 8:
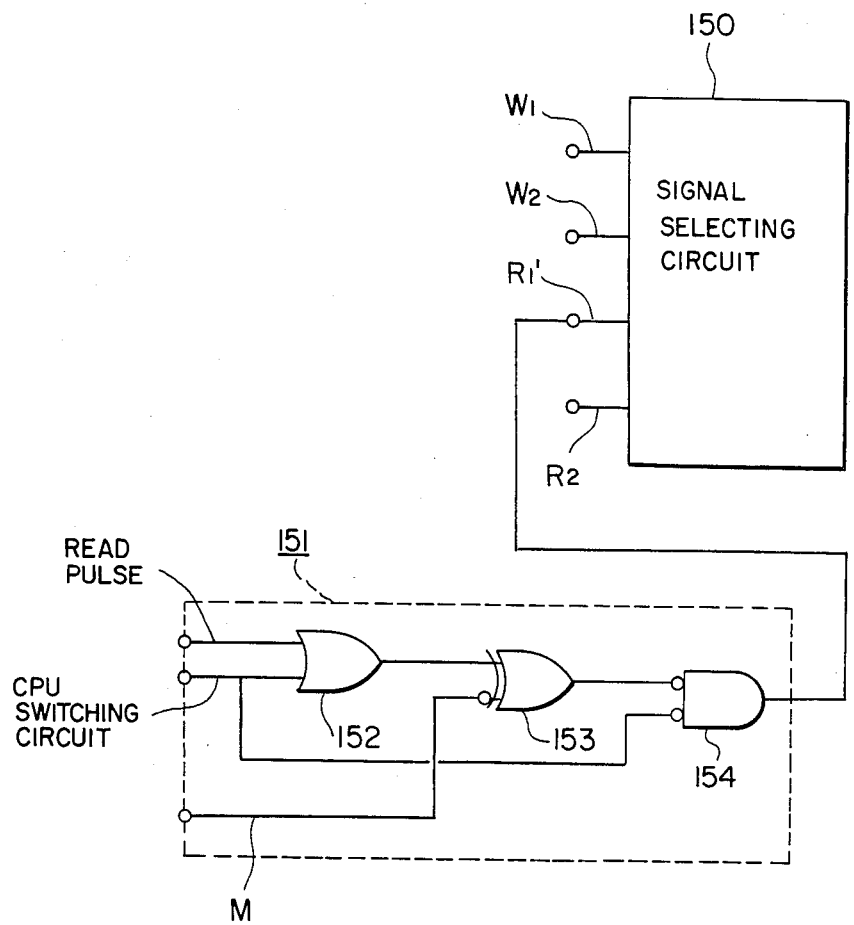
FIG. 8 is a circuit diagram showing another embodiment of a signal selecting circuit according to the present invention.

Another exemplary signal selecting circuit will now be described with reference to FIG. 8. The entirety of the foregoing signal selecting circuit mentioned in connection with FIG. 6 is indicated as a block 150. Only input signals W1, W2, R′1 (undermentioned) and R2 are shown with regard to the signal selecting circuit 150, and other signals are omitted in the illustration.

A logic circuit 151 is additionally connected to the input terminal for a signal R′1 of the signal selecting circuit 150. A read pulse and a CPU switching signal are fed to the logic circuit 151, whose output signal is supplied as a new first read control input signal R′1 to the signal selecting circuit 150. The logic circuit 151 is controlled by a control signal M and, in a wait mode where the control signal M is at a high level, the input signal R′1 is identical with the input signal R1 of FIG. 7C. Meanwhile in a data request mode where the control signal M is at a low level, the input signal R′1 is supplied as a data request signal R′1 (refer to FIG. 9K) which is different from the input signal R1.

The logic circuit 151 consists of, for example, an OR circuit 152 fed with a readout pulse and a CPU switching signal, an exclusive OR circuit 153 fed with an output of the OR circuit 152 and an inverted signal of a control signal M, and a NOR circuit 154 fed with an output of the exclusive OR circuit 153 and a CPU switching signal.

Now the operation of the signal selecting circuit shown in FIG. 8 will be described below with reference to the timing chart of FIG. 9. Signals shown by FIGS. 9A through H are used in a wait mode where access to the RAM is led by the host computer, and correspond respectively to signals shown by FIGS. 9I through P in a data request mode where access to the RAM is led by the RAM controller. FIG. 9C shows a first read control input signal R1, and FIG. 9K shows a first read control input signal R′1.

FIGS. 9A and I show signals for controlling the CPU in the embodiment of FIG. 6, each having a CTL mode and a HOST mode. An input signal R1 shown by FIG. 9C is produced by phase-inverting a read pulse shown by FIG. 9B which will be mentioned later. The input signal R1 shown by FIG. 9C serves to apply, by its rising edge, a read instruction in the first read mode to the pulse forming circuit 94 of the signal selecting circuit 150. The similar action is performed by the undermentioned input signal R′1.

The read pulse shown by FIG. 9B changes the address of the address counter by its falling edge and loads the data in the host computer by its rising edge. Meanwhile the read pulse shown by FIG. 9J loads the data in the host computer by its falling edge and changes the address of the address counter by its rising edge.

FIGS. 9D and L show high-level outputs CO which are carry outputs each representing completion of the read of the address counter in the first read mode of the data read address generator 83 shown in FIG. 5.

FIGS. 9E and M show control signals for the address counter, in which a high level denotes a countable mode while a low level denotes an initial-value loadable mode. If the CPU switching signal is changed from the HOST mode to the CTL mode in the state shown by a broken line before the counter output CO is produced, then the counter control signal is turned from a high level to a low level at the moment of such changeover, as shown by a broken line.

FIGS. 9F and N show low-level load pulses fed to the address counter.

FIGS. 9G and O show read wait signals each turned from a high level to a low level by the rising edges of the input signals R1 and R′1 respectively. The low-level period is varied in accordance with the waiting time, and the data read out from the RAM 47a can be latched during the high-level period.

FIGS. 9H and P show the data each composed of parallel eight bits and latched in the manner mentioned above.

The input signal R′1 shown by FIG. 9K is produced by logically adding a partially inverted CPU switching signal (refer to FIG. 9I) to the read pulse shown by FIG. 9J. Accordingly, the signal R′1 is turned to rise at the moment of changing the CPU switching signal from the CTL mode to the HOST mode, and such rising edge is rendered coincident with the timing of the read instruction as well as other rising edges.

In the wait mode employed generally for reading out data from a solid-state memory, the RAM 47a is commanded by the rising edge of the input signal R1 (refer to FIG. 9C) to read out the data in response to the read pulse (refer to FIG. 7B) generated from the system controller 14 on the basis of a read instruction from the host computer 21, and the data is read out after the read wait signal (refer to FIG. 9G) is turned from a low level to a high level.

Meanwhile in the data request mode employed generally for reading out data from a floppy disc, the RAM controller 46 keeps monitoring the read wait signal (refer to FIG. 9O) after the rise of the input signal R'1, and the data is read out from the RAM 47a with desired timing after the wait signal is turned from a low level to a high level.

The signal selecting circuit of the present invention has a plurality (N) of gate circuits 90a–90d fed with a plurality (N) of signals respectively, and a controlling sequence counter 91 for circulatively opening such gate circuits 90a–90d, wherein the counting operation of the counter 91 is interrupted when a signal is outputted from any gate circuit in its open state. Accordingly, the N gate circuits 90a–90d are opened circulatively by the controlling sequence counter 91 and, if a signal is outputted from any gate circuit, the counting operation of the counter 91 is interrupted while the signal output from the said gate circuit is kept on continuously, and upon termination of such signal output, the counter 91 is permitted to resume its counting operation to open the next gate circuit.

As described hereinabove, the signal selecting circuit contrived according to the present invention is capable of taking out a plurality of signals in an impartial priority order.

I claim:

1. A signal selecting circuit comprising:
    a plurality of input terminals, each being supplied with a separate input signal;
    a plurality of gate circuits, each being connected to a different one of said input terminals;
    a plurality of output terminals, each being supplied with one of said input signals through a separate one of said gate circuits;
    designating means for producing respective gate signals so as to make said plurality of gate circuits circulatively open;
    inhibiting means for detecting when at least one of said plurality of input signals is obtained through one of said gate circuits which is in an open state and for keeping the designation of said designating means at the gate circuit last designated before said one of said plurality of input signals is detected; and
    control means for selecting the number of said gate circuits to be made circulatively open by said designating means.

2. A signal selecting circuit according to claim 1, wherein said designating means includes a sequence counter for generating count values and a decoding circuit for decoding said count values from said sequence counter so as to produce said respective gate signals; said inhibiting means includes circuit means connected to said plurality of gate circuits for detecting when at least one of said plurality of input signals is obtained through one of said gate circuits which is in an open state so as to produce an inhibiting signal to be provided to said sequence counter to stop the counting operation thereof; and said control means includes control circuit means for producing a control signal to cause said sequence counter to count by selected amounts.

3. A signal selecting circuit according to claim 1, further comprising:
    a plurality of shift registers, each having a separate clear terminal, each shift register being connected between a separate input terminal and a separate gate circuit, and with a separate one of said input signals being supplied at the clear terminal thereof;
    a plurality of selectors, each having an input terminal which is supplied with a constant voltage signal, and each selector being connected to a separate one of said shift registers, the output of which is connected to the input of a separate one of said gate circuits, with the output of that gate circuit being connected to the selecting control terminal of said selector.

4. A signal selecting circuit comprising:
    a plurality of input terminals supplied with a plurality of signals respectively;
    a plurality of gate circuits connected to said plurality of input terminals, respectively;
    a plurality of output terminals supplied with said plurality of signals through said plurality of gate circuits, respectively;
    designating means for designating one of said plurality of gate circuits and producing respective gate signals so as to make said plurality of gate circuits circulatively open; and
    inhibiting means for detecting when at least one of said plurality of signals is obtained through one of said gate circuits which is in open state and for maintaining the designation of said designating means at the last designated gate circuit prior to detecting said one signal through one of said gate circuits;
    a plurality of shift registers, each having a separate clear terminal and a separate input terminal, the shift registers being connected between said input terminals and said gate circuits, respectively, and supplied with said input signals at respective clear terminals thereof, respectively;
    a plurality of selectors having separate selecting control terminals, the selectors being connected to said shift registers, respectively, and supplied with a constant voltage signal at respective input terminals thereof, respectively;
    the outputs of said shift registers being connected to the inputs of said gate circuits, respectively; and
    the outputs of said gate circuits being connected to the selecting control terminals of said selectors, respectively.

* * * * *